March 3, 1970 D. I. BOHN 3,498,367
CYCLICALLY OPERATIVE TEMPERATURE CONTROL MEANS
Filed July 10, 1967 2 Sheets-Sheet 1
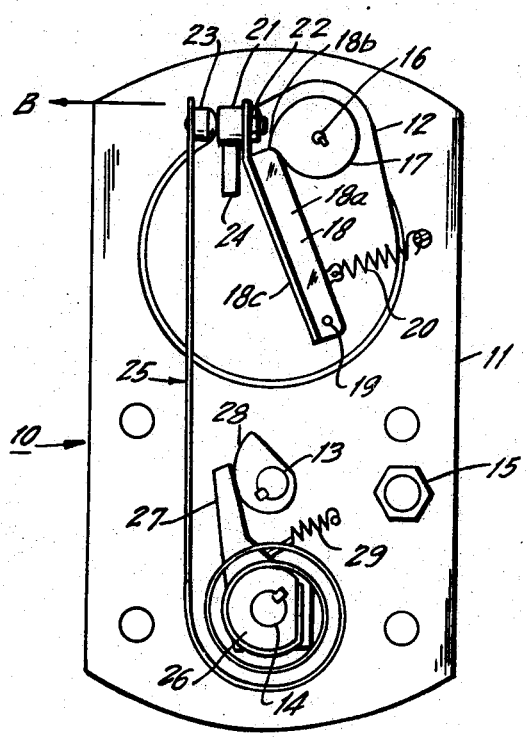
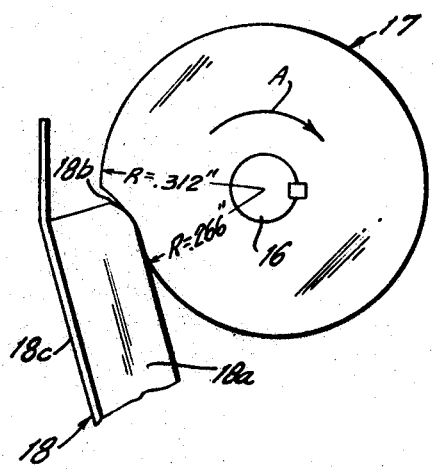
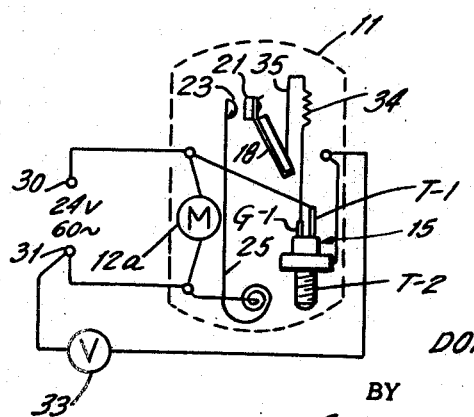
INVENTOR.
DONALD I. BOHN
BY
OSTROLENK, FABER, GERB & SOFFEN
ATTORNEYS March 3, 1970 D. I. BOHN 3,498,367
CYCLICALLY OPERATIVE TEMPERATURE CONTROL MEANS
Filed July 10, 1967 2 Sheets-Sheet 2
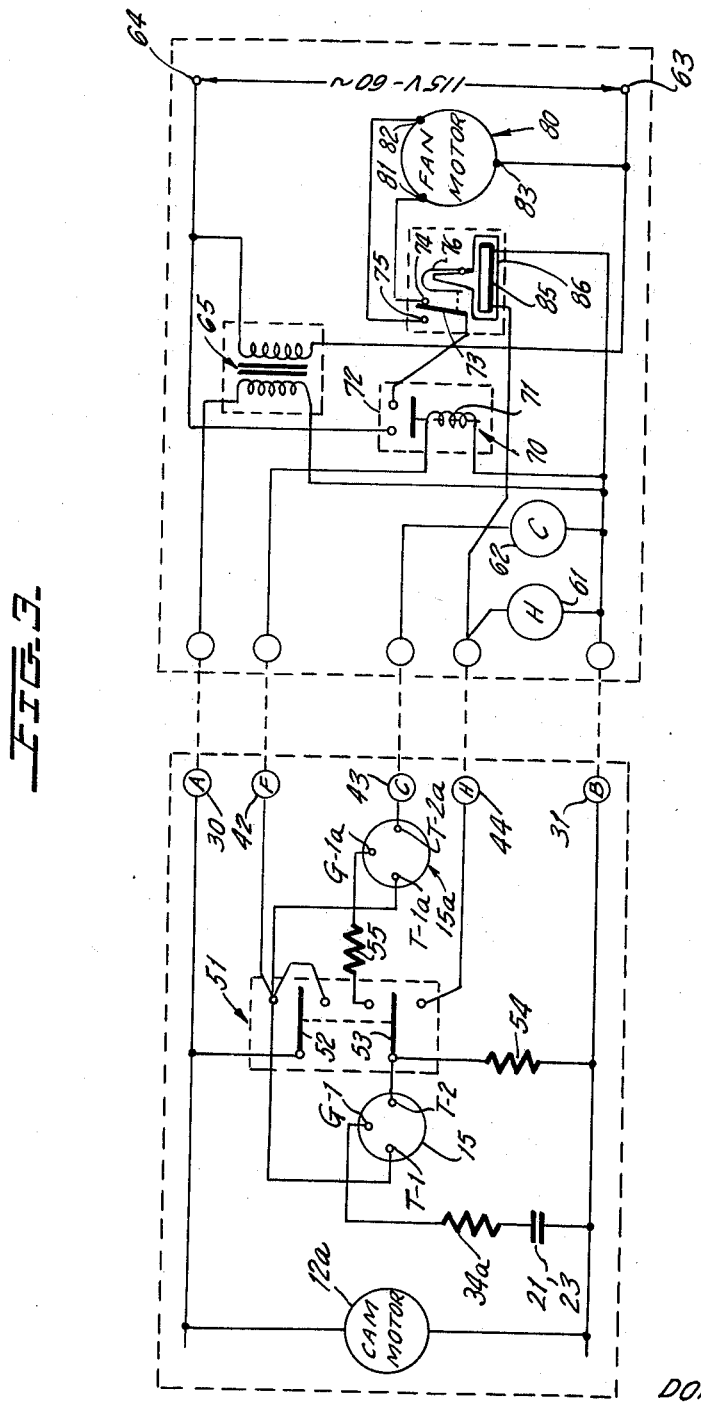
INVENTOR.
DONALD I. BOHN
BY
OSTROLENK, FABER, GERB & SOFFEN
ATTORNEYS

United States Patent Office 3,498,367
Patented Mar. 3, 1970

3,498,367
CYCLICALLY OPERATIVE TEMPERATURE CONTROL MEANS
Donald I. Bohn, Asheville, N.C., assignor to Bohn and Jensen, Inc., Malvern, Pa., a corporation of Pennsylvania
Filed July 10, 1967, Ser. No. 652,122
Int. Cl. H01h 37/12, 37/52
U.S. Cl. 165—26                                                 7 Claims

ABSTRACT OF THE DISCLOSURE

A thermostatic control means is constructed with a pair of cooperating contacts one of which is carried by a temperature responsive bimetal element and the other carried by a follower arm biased into engagement with a cam wheel that is in continuous rotation at uniform angular velocity and acts to drive the contacts toward engagement. The cooperating contacts are constructed of material having relatively high magnetic permeability and a permanent magnet, whose flux field extends through the cooperating contacts, is provided for achieving contact engagement with snap action. The cooperating contacts are connected in the gating circuit of a bidirectional controllably conductive solid state device having its main electrodes connected in series circuit with the main operating control for the heating or cooling device being controlled by the thermostatic control means.

---

This invention relates to temperature control means for heating and/or cooling systems and in particular relates to improvements in control means of the type which function by variably modulating the heating and/or cooling source in accordance with temperature difference on a predetermined length cycle basis.

An interior thermostat control unit of the type described in my U.S. Patent No. 3,050,601 issued Aug. 21, 1962, utilizes a synchronous timing motor to drive a cam means which cyclically displaces one contact of a pair of cooperating contacts, with the other contact of the pair being carried by a bimetal. Whether or not the cooperating contacts engage during a cycle and for what portion of a cycle the cooperating contacts are in engagement is determined by the difference between actual temperature and a desired temperature. It has been found that by utilizing a cycle of predetermined length and variably modulating the application of heat in accordance with the difference between the indicated desired temperature and the existing temperature, the range of temperature fluxuations is maintained within a very narrow band.

In the device of my aforesaid Patent No. 3,050,601 as in other prior art devices of that type snap action between the cooperating contacts is achieved by utilizing a permanent magnet. Since the cooperating contacts were in circuits required to carry appreciable current, the contact material was either of low magnetic premeability or relatively low magnetic permeability as a compromise, and the field of the necessarily relatively powerful permanent magnet for achieving snap action was for the most part shunted around the cooperating contacts. This was found to be less than completely satisfactory since contact pressure changed with contact wear, the overall result being a reduction in accuracy of operation for the thermostat control.

In order to improve overall accuracy of a thermostat control of the type heretofore referred to, the instant invention utilizes a bidirectional controllably conductive solid state device connected in series circuit between the temperature controlled cooperating contacts and the controlled device for generating heat or cold as required. Such series circuit requires relatively little current flow to drive the device into full conduction (low impedance state). Thus, the temperature controlled cooperating contacts in the device of the instant invention are constructed of material having relatively high magnetic permeability providing a path for a relatively low value of permanent magnet flux and there is no need to compromise such permeability in order to achieve low resistance to current flow. Thermostat operation is further improved by having the cam operated contact biased away from the contact carried by the bimetal. This permits the cam to be formed with a fast dropoff, so that the increasing radius portion of the cam (the effective portion) is about 330 degrees.

As will be hereinafter explained, utilization of controllably conductive solid state devices provides relatively simple means for utilizing the thermostatic device of the instant invention to selectively control heating and cooling systems.

Accordingly, a primary object of the instant invention is to provide novel improved constructions for interior thermostat control units.

Another object is to provide novel control units of this type which may be utilized for both heating and cooling systems.

Still another object is to provide novel control units of this type utilizing a controllably conductive solid state device having its control circuit connected to the cyclically operated temperature controlled cooperating contacts.

A further object is to provide a novel control unit of this type in which the cylically operated contact is biased away from the contact carried by the temperature responsive bimetal.

These objects as well as other objects of this invention will become readily apparent after reading the following description of the accompanying drawings in which:

FIGURE 1 is an elevation showing the essential mechanical elements constituting a thermostat control unit constructed in accordance with the teachings of the instant invention.

FIGURE 1A is an enlarged view of the cam of FIGURE 1.

FIGURE 2 is an electrical schematic of the thermostat control unit of FIGURE 1.

FIGURE 3 is an electrical schematic showing the thermostat control unit of FIGURES 1 and 2 utilized in a system for selectively controlling both heating and cooling.

Now referring to the figures and more particularly to FIGURES 1 and 2. Thermostat control unit indicated generally by the reference numeral 10 includes timing motor 12 fixedly mounted at the rear of plate 11 and pins 13, 14 and 19 extending forward of plate 11. In addition plate 11 mounts the circuit elements illustrated in FIGURE 2 including bidirectional controllably conductive solid state device 15 of a type described in detail in U.S. Patent No. 3,275,909 issued Sept. 27, 1966 to Gutzwiller and sold by the General Electric Company under the name Triac.

Timing motor 12 is a conventional pear-shaped synchronous unit so geared that its output shaft 16 rotates at a selected speed preferably in the range of one revolution for each three or more minutes. Cam 17, shown in detail in FIGURE 1A, is keyed to shaft 16 and engages the upper end of follower arm 18 which is pivotally mounted at its lower end to pin 19 and biased thereabout in a clockwise direction by coiled tension spring 20. Arm 18 is of L-shaped cross-section with leg 18a having follower portion 18b lying in a plane parallel to plate 11. The other leg 18c of arm 18 includes a portion which extends beyond the upper end of leg 18a and carries contact 21 secured in place by nut 22. Contact 21 is engageable by cooperating contact 23 carried by bimetal 25 at the free end thereof. Permanent magnet 24 is secured to contact 21 to provide snap action operation for contacts 21, 23.

Bimetal 25 is constructed of strip material having an elongated straight section at the free end thereof and a spiral section at the other end thereof. The free end of the spiral is fixedly secured to partly cylindrical member 26 pivotally mounted on pin 14. Follower portion 27, extending generally radially from member 26, is biased against adjusting cam 28 by coiled tension spring 29. Cam 28 is keyed to pin 13 which is pivoted by a manually operated knob (not shown) to adjust the angular position of member 26 which in turn adjusts the position of contact 23 in accordance with a selected temperature.

As seen in FIGURE 1A, cam 17 is constructed with a gradual change in radius from .266 inch to .312 inch over approximately 330° of cam rotation in the direction indicated by arrow A. There is an extremely sharp drop-off in the remaining 30° of cam rotation to assure quick opening of contacts 21, 23 when required.

As seen in FIGURE 2, motor 12a of timer unit 12 is connected across terminals 30, 31 having 24 volts at 60 cycles applied thereat. Main electrode T-1 of device 15 is connected to terminal 30 while the other main electrode T-2 of device 15 is connected through heat controlling valve element 33 to terminal 31. Gate G-1 of device 15 is connected through resistor 34 and flexible conductor 35 to contact carrying follower arm 18. The spiral end of bimetal 25 is connected through flexible conductor 36 to terminal 31. In the embodiment of FIGURES 1 and 2, bidirectional controllably conductive solid state device 15 has a load current rating of 6 amperes at 60 cycles, gate circuit resistor 34 is 300 ohms and bimetal 25 deflects so that contact 23 moves approximately .027 inch to the left as indicated by arrow B in FIGURE 1 for each 1° F. temperature rise.

Device 15 acts as a closed switch between main electrodes T-1 and T-2 when the AC current supplying gate electrode G-1 is approximately .008 ampere. Thus, the resistance between engaged contacts 21, 23 may be several hundred ohms without any harmful effect. This permits contacts 21, 23 to be constructed of relatively high magnetic material which material would be considered entirely unsatisfactory as contact material for most applications and also permits magnet 12 to be relatively weak and yet achieve a desirably small snap action.

In operation the continuous rotation of cam 17 cyclically moves contact 21 toward and away from contact 23. Engagement between contacts 21 and 23 depends upon the position of contact 23 which is determined by the heating of bimetal 25 and the angular setting of shaft 14. If the ambient temperature is sufficiently above a selected temperature indicated by a temperature scale (not shown) contact 23 is positioned so far to the left throughout the entire cycle that contact 21 never engages contact 23. When the ambient temperature falls below the selected temperature, contact 21 engages contact 23 at least for a portion of the cycle. With contacts 21 and 23 engaged, gate current flows in device 15 lowering the impedance of device 15 and permitting sufficient current to flow between main electrodes T-1 and T-2 to energize valve 33.

Now referring to FIGURE 3 where elements corresponding to those of FIGURES 1 and 2 are given corresponding reference numerals. In FIGURE 3 thermostat control unit 50 is shown connected to apparatus for selectively controlling heating and cooling. Unit 50 includes double pole three position switch 51 having movable contact arms 52, 53 which in the central position shown render unit 50 inactive. Switch arm 52 is connected directly to terminal 30 and in each of its two extreme positions is connected to terminal 42 and main electrode T-1. Switch arm 53 is connected directly to the junction between main electrode T-2 and resistor 54 (8,000 ohms), the latter also being connected directly to terminal 31. Switch arm 53 in its lower position is connected directly to terminal 44 while in its upper position arm 53 is connected through resistor 55 (4,000 ohms) to gate electrode G-1a of another bidirectional controllably conductive solid state device 15a. Main electrode T-1a of device 15a is connected directly to main electrode T-1 while main electrode T-2a of device 15a is connected directly to terminal 43. Resistor 34a (12,000 ohms) is in series circuit with contacts 21, 23 between gate G-1 and terminal 31. Heating means operating control relay or valve 61 is connected between terminals 31 and 44 while cooling means operating control relay 62 is connected between terminals 31 and 43. 110 volts at 60 cycles is applied between terminals 63, 64 and energizes the primary of transformer 65 whose secondary is connected between terminals 30, 31 to produce 34 volts thereat.

Assuming that switch 51 is operated so that contacts 52, 53 are in their down positions to automatically control operation of heating operating relay or valve 61, when contacts 21, 23 engage, current flows through gate electrode G-1 permitting main current to flow through device 15 between main electrodes T-1 and T-2, so that the heating source (not shown) is turned on by relay or valve 61. When contacts 21, 23 separate, flow of current between main electrodes T-1 and T-2 is blocked and heating operating relay or valve 61 is deenergized.

For cooling, the arms of switch 51 are operated to their upper positions. Now when contacts 21, 23 are open, current flow through resistors 54, 55 and gate G-1a renders device 15a conductive between main electrodes T-1a and T-2a in series with cooling operating relay 62 to energize the latter and actuate a cooling device (not shown).

Conversely, when contacts 21 and 23 are closed, device 15 is conductive and establishes switch arm 53 and gate G-1 at about the potential of bus A, which is the potential of electrode T-1a, so device 15a becomes non-conductive and cooling relay C is deenergized.

Operating coil 71 of contactor 70 is connected between terminals 31 and 42 so that coil 71 is energized with switch arms 52, 53 in either their raised or lowered positions. Energization of coil 71 closes normally open contacts 72 thereby connecting terminal 64 to switch arm 73 which normally engages contact 74. Inverted U-shaped bimetal 76 upon sufficient heating thereof deflects to the left with respect to FIGURE 3 to operate arm 73 out of engagement with contact 74 and into engagement with contact 75. Contact 74 is connected directly to the low speed terminal 81 of fan motor 80 having a common terminal 83 connected directly to terminal 63. Contact 75 is connected directly to the high speed terminal of fan motor 80. Resistor 85 for heating bimetal 76 is connected in parallel with heat operating control 61.

Thus, it is seen that with switch arm 73 in its normal position engaging contact 74, fan motor 80 will operate at low speed with switch 51 in either of its two extreme positions. With switch 51 in its lower position for automatic heat control, resistor 85 will have heating energy applied thereto whenever heat operating control 61 is energized. The heat generated by current flow resistor 85 raises the temperature of heat sink 86 to which bimetal 76 is mounted. This causes the temperature of bimetal 76 to rise in relation to the duty cycle of heat operating control 61. When the duty cycle of heat operating control 61 is greater than a predetermined value, bimetal 76 operates contact 73 into engagement with contact 75 and fan motor 80 operates at high speed. When the duty cycle of heat operating control 61 falls below this predetermined value, contact 73 again engages contact 74 and fan motor 80 returns to low speed operation to eliminate the undesirable feeling of a large amount of moving cool air which would otherwise come out of the registers in mild weather.

It is noted that resistor 85 is only connected across heat operating control 61 so that fan motor 80 always operates at low speed when cooling is being controlled. This is entirely satisfactory since the B.t.u.'s required for cooling are only about ¼ of those required for heating.

It should now be apparent to those skilled in the art that in the case of gas heating, control 61 would be a conventional solenoid operated valve and for oil heating control 61 would be a relay for turning the burner on and off. It is noted that for control of oil heating, two minor modifications should be made. First, cam 17 should be modified to include a small constant radius portion to insure that some period, say 25 or 30 seconds, would represent the minimum time provided by control 61. In addition, a stack safety switch using an electric eye should be employed since some of the older thermal protective switches have such an excessively long reset time that accurate temperature control would be interferred with.

For electric heating, heat operating control 61 would be a relay which, acting through other devices, would control appropriate electric switches. For controlling heating to a hydronic unit (device including water to air heat exchanges, usually a finned metal tubing, with an individual blower), heat operating control 61 would be a conventional solenoid valve or small motor operated valve.

For cooling, cooling operating control 62 would in most cases be a relay or a contactor controlling a compressor. For hydronic systems, cooling operating control 62 would be a small solenoid valve or motor operated valve.

Thus, it is seen that the instant invention provides a relatively inexpensive yet reliable construction for a thermostatic control means operating on the principle of producing a control signal that is variably modulated within recurring cycles of uniform length. Such thermostatic control means includes a bidirectional controllably conductive solid state device operated to its conducting and blocking states through action in a gating circuit having temperature operated contacts of relatively high magnetic permeability. A permanent magnet field extending through these contacts to provide snap action on closing and the contacts are biased toward open position so as to achieve reliable fast opening under predetermined conditions.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Thermostat control means including a bimetal element, means maintaining one end of said bimetal relatively fixed and permitting deflection of the other end of said bimetal responsive to temperature changes, a first contact mounted to said bimetal near said other end, a second contact engageable with said first contact, biasing means urging said second contact away from said first contact, cam means, continuously operable drive means cyclically operating said cam means to move said second contact toward said first contact whereby under predetermined conditions of temperature said contacts engage for a portion of each cycle determined by deflection of said other end of said bimetal.

2. Thermostat control means as set forth in claim 1 in which there is a cam follower means to which said second contact is mounted, said biasing means urging said cam follower against said cam means.

3. Thermostat control means as set forth in claim 2 in which said cam means is a disk-like member rotated by said drive means in a direction such that said cam means presents a gradually increasing radius to said follower means for at least 300 degrees of cam rotation followed by a sharp reduction in radius.

4. Thermostat control means at set forth in claim 1, also including a bidirectional controllably conductive solid state means having a gate means through which signals are applied to control current flow through said solid state means between main electrodes thereof, said first and second contacts connected in circuit with said gate means to control application of signals thereto.

5. Thermostat control means as set forth in claim 4, including a permanent magnet generating a flux field passing across a gap formed between said first and second contacts when the latter are in close proximity, said first and second contacts constructed of material having relatively high magnetic permeability.

6. Thermostat control means as set forth in claim 4, in which the first contact tends to move away from said second contacts upon heating of said bimetal, heating control means and cooling control means, an additional bidirectional controllably conductive solid state means having additional gate means and additional main electrodes, a selector switch operable to a first and a second position, with said switch in said first position said additional solid state means being inactive and said solid state means being active with said main electrodes connected in series circuit with said heating control means whereby the latter is actuated while said first and second contacts are engaged, with said switch in said second position both said solid state device and said additional solid state device being active with said cooling control connected in series circuit with said additional main electrodes and said additional gate means connected in circuit with said main electrodes whereby said cooling control is actuated while said first and second contacts are open.

7. Thermostat control means as set forth in claim 6, also including a circulating motor having automatic means for automatically changing speed of said circulating motor from relatively slow to relatively fast upon predetermined heating conditions, said automatic means including temperature responsive means fixedly connected in circuit with said heating control means, said switch means when in said second position connecting said circulating motor in circuit for said relatively slow speed operation and deactivating said automatic means.

References Cited

UNITED STATES PATENTS

| | | | |
|---|---|---|---|
| 3,050,601 | 8/1962 | Bohn | 337—305 |
| 3,240,959 | 3/1966 | McDonald et al. | 337—305 |
| 2,769,061 | 10/1956 | White et al. | 337—361 |

FOREIGN PATENTS

| | | |
|---|---|---|
| 467,625 | 1/1947 | Canada. |

BERNARD A. GILHEANY, Primary Examiner

U.S. Cl. X.R.

307—117, 252, 310; 337—301, 305, 351